United States Patent [19]
Cameron

[11] Patent Number: 5,975,017
[45] Date of Patent: Nov. 2, 1999

[54] EXTERIOR MOUNTED HOUSING FOR ANIMAL LITTER BOX

[76] Inventor: Eddie M. Cameron, 2330 E. Ave. J8 Space 71, Lancaster, Calif. 93535

[21] Appl. No.: 08/991,153

[22] Filed: Dec. 16, 1997

Related U.S. Application Data

[60] Provisional application No. 60/033,383, Dec. 16, 1996.

[51] Int. Cl.⁶ ................................................. A01K 1/03
[52] U.S. Cl. ........................................ 119/165; 119/484
[58] Field of Search .................................. 119/163, 165, 119/484, 485

[56] References Cited

U.S. PATENT DOCUMENTS

| | | | |
|---|---|---|---|
| 2,932,279 | 4/1960 | Giles | 119/484 |
| 4,021,975 | 5/1977 | Calkins | 119/165 |
| 4,291,645 | 9/1981 | Cruchelow et al. | 119/484 |
| 4,788,934 | 12/1988 | Fetter | 119/484 |
| 4,989,546 | 2/1991 | Cannaday | 119/484 |
| 5,165,366 | 11/1992 | Harvey | 119/165 |
| 5,782,205 | 7/1998 | Veras | 119/484 |

*Primary Examiner*—Michael J. Carone
*Assistant Examiner*—Elizabeth Shaw
*Attorney, Agent, or Firm*—Roger A. Marrs

[57] ABSTRACT

A housing is mounted on the exterior side of a dwelling having a storage compartment for removeably holding a litter box. A hollow open-ended tunnel interconnects the interiors of the dwelling and housing respectively. The tunnel is rigid in a cantilevered position. A pivotal door in the side of the housing or enclosure permits access for insertion or removal of the litter box. A platform panel with a central hole separates a lower compartment of the litter box from an upper compartment.

6 Claims, 1 Drawing Sheet

EXTERIOR MOUNTED HOUSING FOR ANIMAL LITTER BOX

Copending Provisional application No. 60/033,383 filed Dec. 16, 1996.

BACKGROUND OF THE INVENTION

1. Field of the Invention

The present invention relates to the field of animal accessories such as a litter box, and more particularly to a novel housing mounted exteriorly of a dwelling for removably holding a litter box and which includes a tunnel communicating the interior of the dwelling with the housing to permit passage of an animal.

2. Brief Description of the Prior Art

It has been the conventional practice to use a variety of litter boxes to accommodate collection and disposal of animal deposits and litter. Usually, the box is placed inside a dwelling so that the litter is available to an animal, such as a cat, and so that the animal does not have to leave the interior of the dwelling. Because the litter box is on the interior of the dwelling, undesirable smells, odors and spillage results intrude upon the tranquility of the interior dwelling for occupants. Furthermore, once the litter box has been used, the owner of the animal must physically transport the litter box outside of the dwelling for emptying and cleaning purposes.

Therefore, a long-standing need has existed to provide a novel housing which can be installed on the exterior of a dwelling into which a removable litter box can be placed. Communication means must be provided between the interior of the dwelling and the interior of the housing to permit passage of an animal therebetween in order to use the litter box.

SUMMARY OF THE INVENTION

Accordingly, the above problems and difficulties are avoided by the present invention which provides a novel exterior mounted housing for an animal litter box which provides a totally enclosed housing that is mounted on the exterior wall of a dwelling and which further includes an open-ended tunnel disposed through the wall of the housing which permits passage of an animal between the interior of the dwelling and the interior of the housing. The housing further includes a bottom on which a litter box is removably placed and further includes a platform in spaced relationship to the bottom having an opening sufficient to permit the animal to have access to the platform for sitting or perching purposes. Adjacent to the platform is a plurality of vents or openings to permit passage of ambient air to enter and circulate within the housing through the opening in the platform. Adjacent to the vents and the platform, there is provided an auxiliary opening to receive one end of the open-ended tunnel which terminates at its opposite end in another housing so that a plurality of housings may be joined in spaced-apart relationship with respect to each other on the exterior side of the dwelling. The housing further includes a hinged door which permits access to the litter box for removal and installation purposes.

Therefore, it is among the primary objects of the present invention to provide a novel external housing for an animal litter box which permits passage of an animal from the interior of a dwelling to the exterior housing, and which further includes an outside pivotal door for selectively allowing removal of the litter box for cleansing purposes.

Another object of the present invention is to provide a novel housing intended to be mounted on the exterior wall surface of a dwelling which includes an edge marginal flange through which fasteners may be placed for mounting the housing onto the exterior wall, and which further includes a pair of compartments wherein one compartment removably stores or houses a litter box while the other compartment is used for sitting or resting purposes.

A further object of the present invention is to provide an open-ended tunnel between an exterior housing and the interior of a dwelling to permit passage of an animal therebetween so that the animal may use a litter box in one compartment in the housing and may use a sitting or resting platform in another compartment of the housing.

Another object of the present invention is to provide several housings to be installed on the exterior wall of a dwelling and to provide open-ended communication means between the housings to permit passage of an animal therebetween.

Yet another object of the present invention is to provide a novel means for placing an animal litter box exterior of a dwelling in a housing having a pivoted door so that the litter box may be removed for cleaning purposes, and which further includes an open-ended passageway communicating the interior of the housing with the interior of the dwelling so as to permit passage by the animal therebetween.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
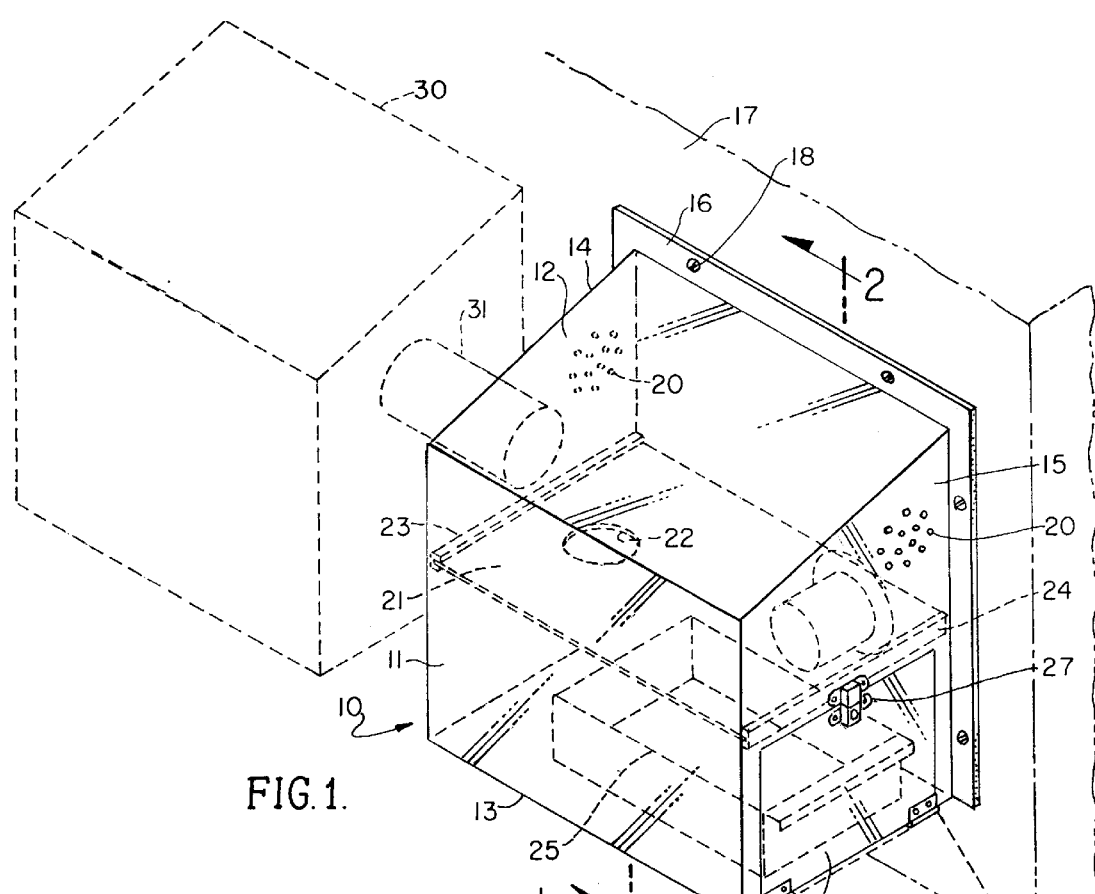
FIG. 1 is a front perspective view of the novel exterior mounted housing for an animal litter box incorporating the present invention.

Referring to FIG. 1, the novel housing for removably enclosing a litter box is indicated in the general direction of arrow 10 and it can be seen that the housing includes a front facing 11 having a top panel 12 and a lower or bottom panel 13 with right and left side panels 14 and 15 respectively. It is to be particularly noted that the panels are composed of a transparent material, such as plastic or the like, so that an animal within the housing has the opportunity of viewing the surrounding environment without leaving the housing. The respective panels 12, 13, 14 and 15 include edge marginal flanges, such as flange 16, associated with top panel 12. The flanges are placed in flush abutment with the outside wall of a housing, as indicated by numeral 17, and fasteners, such as indicated by numeral 18, are employed for securing the housing to the external surface of the wall 17. Fasteners may take the form of bolts, screws, nails or the like. Also, it is envisioned that a suitable adhesive may be placed on the opposing surfaces of the wall 17 and the flanges in order to secure the housing to the wall.

It is also to be noted that the side panels 14 and 15 include a ventilating means, such as slits or openings, represented by the numeral 20, so that the interior of the housing is communicated exteriorly whereby circulation of air through the housing is promoted. The housing also includes a platform 21 on which an animal can rest while it peers through the transparent panels at the surrounding environment. The platform 21 includes an opening 22 to accommodate the size of an animal so that the animal may progress from a first or lower compartment to a second or upper compartment. The platform 21 is held in position by retainers 23 and 24 on opposite sides of the housing and which are suitable secured to the inside surfaces of the side panels 14 and 15 respectively.

It can be seen that the first or lower compartment is partially occupied by a litter box 25 that is of a suitable size to accommodate the animal. The inside of the box may contain a quantity of litter and the door 26 is hingeably carried on the side panel 15 so that it may be opened to the position shown in broken lines to permit installation or removal of the litter box 25 from the compartment. A suitable latch mechanism 27 is carried on the door 26 and the panel 15 so that the door will be maintained closed until the user desires to remove the litter box.

A second or additional housing 30 may be mounted onto the exterior surface of wall 17 in the same manner as previously described with respect to the housing 10. Connection between the two housings 10 and 30 is achieved by an elongated passageway 31 which is open-ended to terminate in the respective housings. Thus, the animal may travel between the two housings at will. Such an arrangement greatly adds to the comfort of the animal and relieves boredom.

Figure 2:
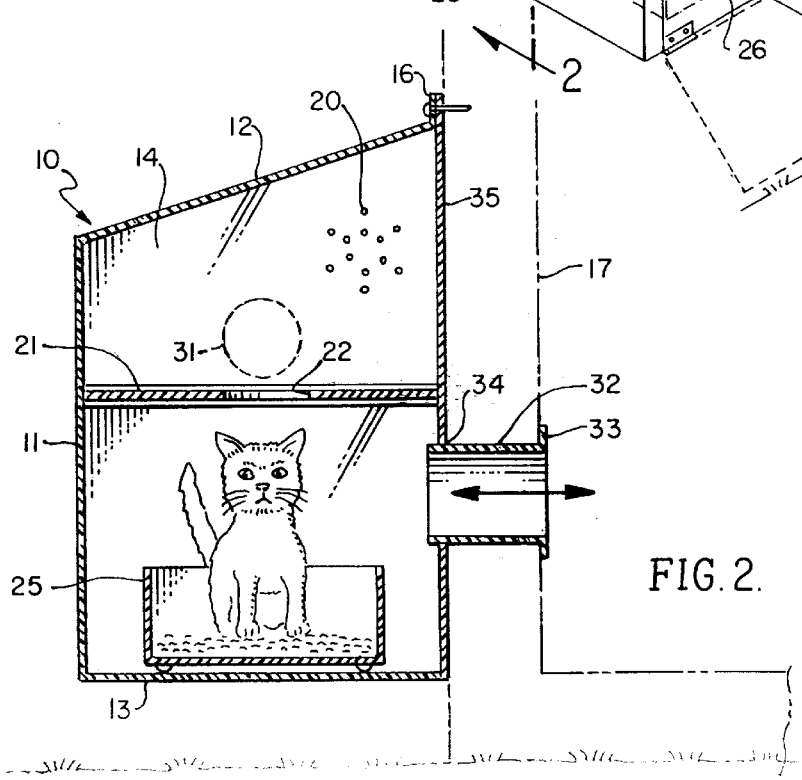
FIG. 2 is a transverse cross-sectional view of the exterior mounted housing shown in FIG. 1 as taken in the direction of arrows 2—2 illustrating communication between the interior of a dwelling and the interior of the housing.

Referring now in detail to FIG. 2, it can be seen that the housing 10 communicates with the interior of the dwelling of which wall 17 is a part. Communication between the interior of the dwelling is through the wall 17 and is accomplished by a tunnel taking the form of a tube 32 which is open-ended. The tube has one opening into the interior of the dwelling while the other opens into the interior of a selected compartment of housing 10. In the present illustration, the tubing 32 is terminated in the first or lower compartment of the housing. It is to be particularly noted that the length of tube 32 is sufficient to completely pass through the thickness of wall 17 and that a flange 33 is employed as a stop for installing the tube 32 through the wall. Once a hole in the wall has been provided, the tube is inserted into the wall until the flange 33 engages with the inside surface of the wall 17. If the length of the tube 32 is longer than the thickness of wall 17, a portion of the tube will project into the housing 10. Also, in order to accommodate the total tube 32, a hole, indicated by numeral 34 which accommodates the diameter of the tube 32 so that the tube end may enter the housing 10. The opening or hole 34 is provided in a back panel 35 of the housing 10. Preferably, the housing 10 is secured to the wall 17 above ground level. This not only gives the animal a chance to look down at the surrounding environment but also accommodates placement of the tunnel 32 in a position above the floor of the dwelling which is normally above ground level.

Therefore, it can be seen that the housing 10 is readily installed and secured to the outside surface of a dwelling wall 17 and that access is gained between the interior of the housing and the interior of the dwelling through an open-ended tunnel 32 which is fitted into an opening through the thickness of wall 17. The animal may enter the housing through the tunnel and may use the litter box 25 in the usual manner. Should the animal wish to remain within the housing, the animal may progress through opening 22 onto platform 21. Should the animal wish to go to housing 30, the animal may travel through the open-ended passageway 31. When it is desired to clean the litter box 2.5, the latch 27 may be opened so that the door 26 can pivot downwardly giving the user access to the litter box for removal, cleaning and insertion back into the housing.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An exterior mounted housing for an animal litter box comprising:

an enclosure having a flat backwall;

an opening in said flat backwall;

an open-ended tunnel having a selected end disposed in said opening so as to outwardly project from said flat backwall and further having an open-ended passageway communicating with the interior of said enclosure;

said enclosure includes a bottom and said tunnel is disposed above said bottom in fixed spaced-apart relationship;

said housing having opposite side walls joined by said bottom and said tunnel being disposed midway between said side walls in fixed spaced-apart relationship and said housing having an internal storage compartment defined between said side walls;

a litter box removably disposed in said storage compartment in communication with said tunnel;

said tunnel is a tube having a mounting flange carried on its end opposite from said selected end;

a selected side wall includes a pivotal door with an open position providing access into said interior storage compartment permitting passage of said litterbox; and said enclosure includes a lower compartment removably enclosing said litterbox and an upper compartment; and a panel separating said upper compartment and said lower compartment with a hole in said panel intercommunicating said upper compartment with said lower compartment.

2. The enclosure defined in claim 1 including:

ventilation means provided on said side walls of said enclosure communicating with said upper compartment.

3. The enclosure defined in claim 2 wherein:

said tubular tunnel supports said enclosure in a cantilevered position externally of and outwardly from a dwelling.

4. The enclosure defined in claim 3 wherein:

said enclosure is composed of a transparent material.

5. A housing for a litterbox mountable on the side of a dwelling wall comprising:

an enclosure;

means interconnecting said enclosure with said dwelling for supporting said enclosure in a cantilevered position outward from said dwelling;

said dwelling having a support wall with a hole communicating with the interior of said dwelling;

said enclosure having a hole in alignment with said hole in said dwelling wall;
said interconnecting means includes a tubular tunnel having open-ended opposite ends communicating the interior of said dwelling with the interior of said enclosure;
said enclosure is solely supported in said cantilevered position by said tubular tunnel; and
said tubular tunnel includes a circular mounting flange on a selected end disposed in the interior of said dwelling for mounting to said support wall.

6. The housing defined in claim 5 wherein:
said enclosure includes a lower compartment removeably enclosing said litter box and and upper compartment; and
a panel separating said upper compartment and said lower compartment with a hole in said panel intercommunicating said upper compartment with said lower compartment.

* * * * *